United States Patent
Bayley et al.

(10) Patent No.: US 8,054,163 B2
(45) Date of Patent: *Nov. 8, 2011

(54) INTERACTIVE RADIO FREQUENCY TAGS

(75) Inventors: Oliver T. Bayley, Pacifica, CA (US);
Bernard J. Kerr, Wellington (NZ);
Geoffrey M. Smith, Palo Alto, CA (US);
James E. Dishman, Portland, OR (US);
Mark A. McCabe, San Mateo, CA (US);
John M. Ananny, San Francisco, CA (US)

(73) Assignee: Interval Licensing LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,800

(22) Filed: Oct. 21, 2010

(65) Prior Publication Data

US 2011/0095890 A1    Apr. 28, 2011

Related U.S. Application Data

(63) Continuation of application No. 12/533,095, filed on Jul. 31, 2009, now abandoned, which is a continuation of application No. 11/737,283, filed on Apr. 19, 2007, now Pat. No. 7,586,397, which is a continuation of application No. 09/306,688, filed on May 6, 1999, now abandoned.

(51) Int. Cl.
*H04Q 5/22* (2006.01)

(52) U.S. Cl. ............... 340/10.42; 340/572.4; 340/10.51

(58) Field of Classification Search ............... 340/10.4, 340/572.8, 572.4, 10.51, 9.15
See application file for complete search history.

(56) References Cited

U.S. PATENT DOCUMENTS

| | | | |
|---|---|---|---|
| 4,817,136 A | 3/1989 | Rhoads |
| 5,313,848 A | 5/1994 | Santin et al. |
| 5,314,336 A | 5/1994 | Diamond et al. |
| 5,434,572 A | 7/1995 | Smith |
| 5,461,385 A | 10/1995 | Armstrong |
| 5,491,672 A | 2/1996 | Ferris et al. |
| 5,550,547 A | 8/1996 | Chan et al. |
| 5,644,557 A | 7/1997 | Akamine et al. |
| 5,649,296 A | 7/1997 | MacLellan et al. |
| 5,729,697 A | 3/1998 | Schkolnick et al. |
| 5,732,229 A | 3/1998 | Dickinson |

(Continued)

OTHER PUBLICATIONS

"Radio-frequency identification," Wikipedia, http://en.wikipedia.org/wiki/Rfid, pp. 1-17 [internet accessed Mar. 20, 2007].

(Continued)

*Primary Examiner* — Vernal Brown
(74) *Attorney, Agent, or Firm* — Perkins Coie LLP

(57) ABSTRACT

Interactive radio frequency tags that are responsive to external stimuli to change state are disclosed. The tags preferably include a passive radio frequency transponder, having an antenna, an interface for receiving an external stimulus, and one or more integrated circuits responsive to the external stimulus received at the interface to change the state of the transponder. Also disclosed is a "sensor tag" which changes state in response to a particular environmental stimulus. In addition, either of these "button" or "sensor" features may be combined with an output feature which visually, audibly, tactilely or otherwise signals the state or change of state of an RF tag, or the tag may be designed to produce an output in response to the external stimulus of the RF signal received at the tag's antenna.

18 Claims, 7 Drawing Sheets

U.S. PATENT DOCUMENTS

| | | | |
|---|---|---|---|
| 5,764,138 | A | 6/1998 | Lowe |
| 5,774,117 | A | 6/1998 | Kukkal et al. |
| 5,798,693 | A | 8/1998 | Engellenner |
| 5,813,153 | A | 9/1998 | Maglio |
| 5,818,348 | A | 10/1998 | Walczak et al. |
| 5,864,626 | A | 1/1999 | Braun et al. |
| 5,936,523 | A | 8/1999 | West |
| 5,936,527 | A | 8/1999 | Isaacman et al. |
| 5,936,530 | A | 8/1999 | Meinhold |
| 5,943,624 | A | 8/1999 | Fox et al. |
| 5,963,136 | A | 10/1999 | O'Brien |
| 5,982,363 | A | 11/1999 | Naiff |
| 5,982,520 | A * | 11/1999 | Weiser et al. ............ 398/126 |
| 6,008,727 | A | 12/1999 | Want et al. |
| 6,036,086 | A | 3/2000 | Sizer, II et al. |
| 6,044,353 | A | 3/2000 | Pugliese, III |
| 6,067,018 | A | 5/2000 | Skelton et al. |
| 6,084,949 | A | 7/2000 | Yun |
| 6,100,840 | A | 8/2000 | Zidek et al. |
| 6,144,848 | A | 11/2000 | Walsh et al. |
| 6,201,474 | B1 | 3/2001 | Brady et al. |
| 6,212,401 | B1 | 4/2001 | Ackley |
| 6,292,172 | B1 | 9/2001 | Makhlouf |
| 6,311,214 | B1 | 10/2001 | Rhoads |
| 6,319,010 | B1 | 11/2001 | Kikinis |
| 6,462,656 | B2 | 10/2002 | Ulrich et al. |
| 6,483,427 | B1 | 11/2002 | Werb |
| 6,531,964 | B1 | 3/2003 | Loving |
| 6,542,933 | B1 | 4/2003 | Durst, Jr. et al. |
| 6,564,620 | B1 | 5/2003 | Jaeger |
| 6,577,861 | B2 | 6/2003 | Ogasawara |
| 6,609,656 | B1 | 8/2003 | Elledge |
| 6,611,673 | B1 | 8/2003 | Bayley et al. |
| 6,725,713 | B2 | 4/2004 | Adamson et al. |
| 6,806,808 | B1 | 10/2004 | Watters et al. |
| 6,859,650 | B1 | 2/2005 | Ritter |
| 6,978,118 | B2 | 12/2005 | Vesikivi et al. |
| 6,983,124 | B1 | 1/2006 | Bayley et al. |
| 7,034,660 | B2 | 4/2006 | Watters et al. |
| 7,102,499 | B2 | 9/2006 | Myatt et al. |
| 7,290,709 | B2 | 11/2007 | Tsai et al. |
| 7,538,745 | B2 | 5/2009 | Borovoy et al. |
| 7,586,397 | B2 | 9/2009 | Bayley et al. |
| 2006/0040704 | A1 | 2/2006 | Bayley et al. |
| 2009/0170484 | A1 | 7/2009 | Bayley et al. |
| 2009/0284353 | A1 | 11/2009 | Bayley et al. |

OTHER PUBLICATIONS

"RFID system monitors temperature, humidity," Food productiondaily.com—Europe, http://www.foodproductiondaily.com/news/ng.asp?id=68167-rfid-temperature-humidity, May 6, 2006, 2 pages [internet accessed Mar. 20, 2007].

Sirico, L., "Why RFID is Getting Tire'd," RFIDswitchboardä, Issue 67, Jul. 6, 2006, http://www.rfidsb.com/showthread.php?t=95, pp. 1-3 [internet accessed Mar. 20, 2007].

Wikimedia Foundation, Inc., "CueCat," Wikipedia, the free encyclopedia, 3 pages, http://en.wikipedia.org/w/index.php?title=CueCat&printable=yes [accessed May 31, 2007].

* cited by examiner

220

INTERACTIVE RADIO FREQUENCY TAGS

CROSS-REFERENCE TO RELATED APPLICATION(S)

This is a continuation of U.S. patent application Ser. No. 12/533,095, filed on Jul. 31, 2009 now abandoned, which is a continuation of U.S. patent application Ser. No. 11/737,283, filed on Apr. 19, 2007, now U.S. Pat. No. 7,586,397 issued Sep. 8, 2009, which is a continuation of U.S. patent application Ser. No. 09/306,688, filed on May 6, 1999 now abandoned; all of which are hereby incorporated herein by reference in their entireties.

BACKGROUND

The present invention relates generally to the field of radio frequency tag technology. More specifically, the present invention relates to passive radio frequency tags which are capable of changing state in response to an external stimulus.

Radio frequency (RF) tag technology has conventionally been used for identifying objects in radio frequency identification (RF ID) systems. In an RF ID system, information is carried on a tag (transponder) which is typically attached to an object of interest. When the tag comes within a RF signal field generated by a reader (transceiver) the tag responds to the incident RF signal. Typically, the tag reflects the incident RF carrier back to the reader in a form modulated by the tag according to the information with which the tag has been previously programmed.

RF tags may be passive or active. Active tags are powered by a battery which is incorporated into the tag. Passive tags do not have batteries. They derive their power inductively or capacitively from the RF signal transmitted by the reader to interrogate the tag.

FIG. 1A illustrates a conventional passive RF tag. The tag 100 has two main components: a semiconductor chip (integrated circuit (IC)) 102 having interface circuits, logic, and memory (not shown); and an antenna 104. The interface circuits of the IC 102 portion of a passive RF tag typically include an analog and a digital circuit. The analog circuit detects and decodes the RF signal and provides power to the digital circuit using the RF field strength of the reader. The digital circuit implements an information protocol which has been previously programmed into the tag. RF tags generally also include a variety of other discrete components, such as capacitors, clocks, and interconnections between components, a substrate for mounting components, and an enclosure.

FIG. 1B depicts a block diagram providing additional structural information for a typical passive RF tag. The figure is not a schematic depiction of an RF tag, but is intended as an illustration of the main function elements of a typical tag and their interconnections to provide a basis for describing the actions that take place when a tag (transponder) enters the RF field of a reader (transceiver), in order to assist in the understanding of the operation of RF tags.

An RF signal from a transceiver is received by the tag's antenna 110 when the tag enters the reader's RF field. From the antenna 110, the signal is typically smoothed by a capacitor 111, and split into a portion that provides the power for the tag, and a portion that provides the data to be read by and responded to by the tag's programmed logic. The power portion of the signal goes into a rectifier 112 (AC to DC converter) and the emerging DC signal is smoothed by a capacitor 104. The data portion of the split signal is conveyed along a conductive line 116 to a data extractor 118 which demodulates the signal and extracts the digital binary command data for the logic processor 120. The logic processor 120 receives the command and carries out the command instructions, which typically involves reading data from the tag's memory 122. The data read from the memory 122 is then output to a modulator 124 which modulates the digital data into an analog signal. The signal is then conveyed to the antenna 110 and transmitted back to the transceiver. RE tags also typically include additional elements not illustrated in FIG. 1B or discussed above, such as encoders/decoders and clock extractors.

As noted above radio frequency (RF) tag technology, particularly passive RF tag technology, has conventionally been used for identifying objects in radio frequency identification (RF ID) systems. Thus the conventional application of RF tags has been in tracking objects of interest. When the tag comes within a RF signal field generated by a reader (transceiver) the tag responds to the transceiver's incident RF signal alerting the transceiver of its presence. A typical reader includes a computer processor which issues commands to a RF transmitter and receives commands from an RF receiver. The processor may also perform one or more functions based on the tag's presence in its RF field.

For example, RF tags are used by airlines to track passenger luggage. When a passenger checks a piece of luggage it is tagged with an RF ID tag programmed with an identifier for that piece of luggage. When the luggage tag comes within the RF signal field of one of many RF ID readers located throughout the luggage system, the tag may be interrogated by the reader and the location of the luggage may be reported to a central tracking system by the reader's processor. Similarly, RF tag technology is used in "card key" systems. A card key contains a RF ID tag identifying the holder as a person authorized to pass through a door or gate. When the card comes within the RF signal field of an RF ID reader located at a door or gate, the tag may be interrogated by the reader and the authorization of the cardholder to pass may be confirmed, the door or gate my be opened, and the cardholder's passage recorded by the reader's processor.

While conventional implementations of RF tag technology have been useful in such tracking applications, the role of RF tags in these applications is static. That is, once a passive RF tag is programmed with information, it is simply polled by a reader. The tag may be reprogrammed with different information, but at any given time the tag has just one information state. The present inventors believe that RF tag technology offers the potential for a whole array of unexplored applications based on dynamic RF tags, that is, RF tags that are capable of existing in more than one information state without reprogramming. Accordingly, there is a need for the development of such dynamic, interactive RF tag technology.

SUMMARY

The present invention meets this need by providing interactive RF tags. These tags are responsive to external stimuli to change state. In one aspect, interactive radio frequency tags in accordance with the present invention preferably include a passive radio frequency transponder, having an antenna, an interface for receiving an external stimulus, and one or more integrated circuits responsive to the external stimulus received at the interface to change the state of the transponder. The nature of the interface and the corresponding external stimuli, as well as the change of state may vary substantially while remaining consistent with this inventive concept.

For example, a tag may be configured to change state when one or more buttons on the tag is pushed by a user. Variations on this idea include a "single button tag" that may only be read when a button on the tag is pushed; or a "switch" tag that alternates between memories (or memory addresses) that are accessed for information when the tag is polled by a reader depending on whether or not a button is pushed, and others.

Another type of interactive RF tag is a "sensor tag" which changes state in response to a particular environmental stimulus. For example, if a tag is exposed to light or heat that surpasses a given threshold, an alternate memory location containing information reflecting this fact is accessed when the tag is polled by a reader.

In addition, either of these "button" or "sensor" features may be combined with an output feature which visually, audibly, tactilely or otherwise signals the state or change of state of an RF tag.

In one aspect, the invention provides an interactive radio frequency tag apparatus. The apparatus includes a passive radio frequency transponder, including an antenna, an interface for receiving an external stimulus, and one or more integrated circuits responsive to an external stimulus received at the interface to change the state of the transponder.

In another aspect, the invention provides a method of changing the response provided by a polled radio frequency tag. The method involves providing an interactive radio frequency tag apparatus, having a passive radio frequency transponder, including, an antenna, an interface for receiving an external stimulus, and one or more integrated circuits responsive to an external stimulus received at the interface to change the state of the transponder, and applying an external stimulus to the interface to change the state of the transponder.

In yet another aspect, the invention provides a radio frequency tag apparatus. The apparatus has a passive radio frequency transponder, including an antenna, an integrated circuit, and an output device responsive to a radio frequency signal received at said antenna to generate an output signal.

These and other features and advantages of the present invention will be presented in more detail in the following specification of the invention and the accompanying figures which illustrate by way of example the principles of the invention.

DETAILED DESCRIPTION

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to one or more preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
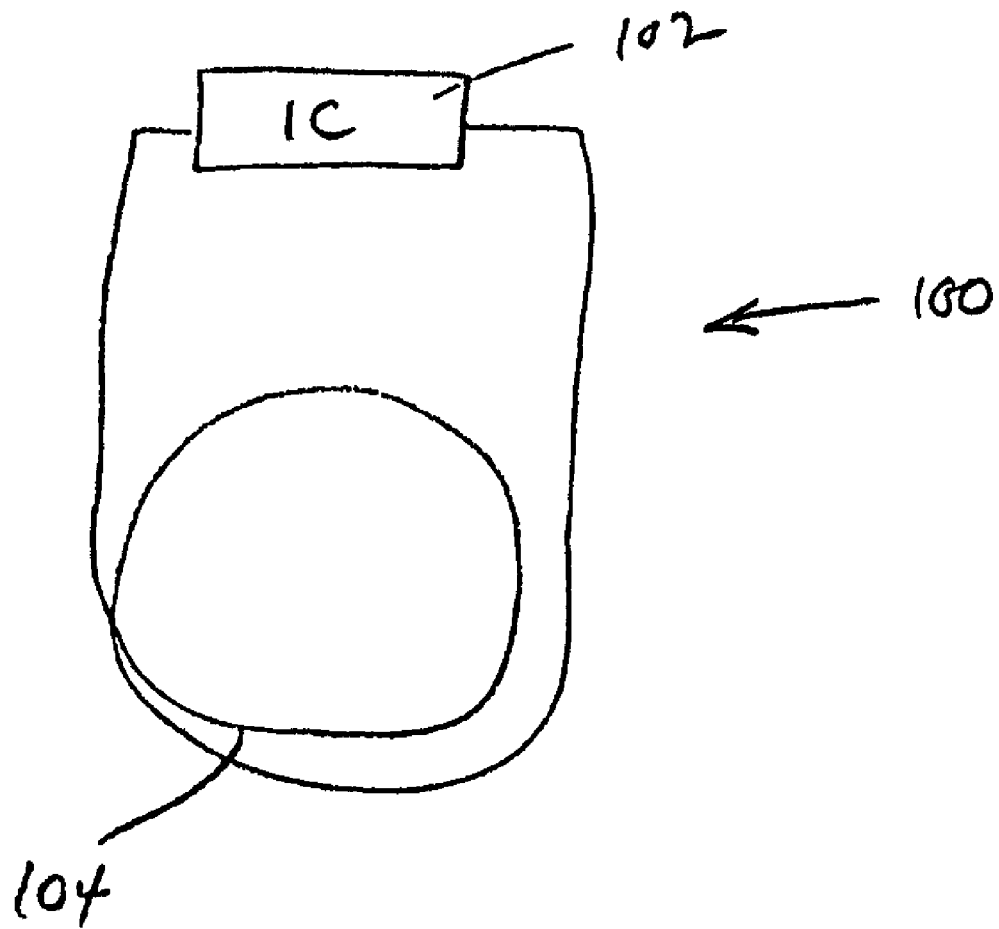
FIG. 1A depicts a block diagram illustrating a conventional passive RF tag.
Figure 1B:
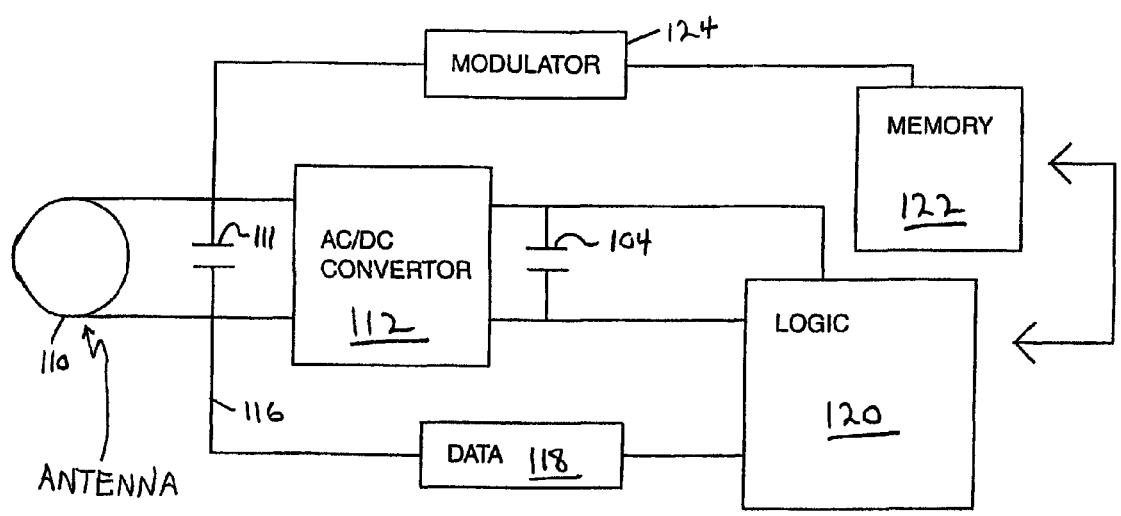
FIG. 1B depicts a block diagram illustrating additional details of a typical passive RF tag.
Figure 2A:
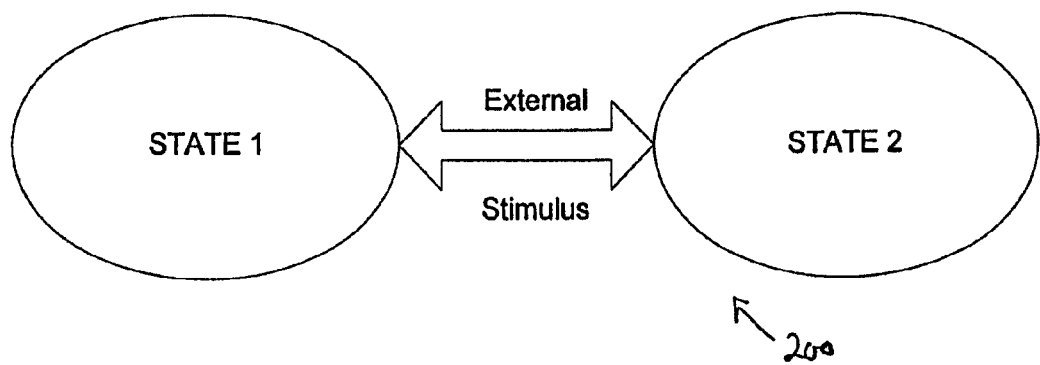
FIGS. 2A-C depict state diagrams illustrating changes of state of various implementations of interactive RF tags in accordance with preferred embodiments of the present invention.

The present invention provides interactive radio frequency transponders, frequently referred to as RF tags. These tags are responsive to external stimuli to change state. The change of state of a tag may produce a different output from the tag when it is polled upon entering the RF field of a radio frequency transceiver, frequently referred to as a RF tag reader. The change of state produced by the external stimulus may be reversible, such as in the case of many implementations of "button tags," wherein a change of state results when one or more buttons on the tag is pushed by a user. This situation is illustrated in FIG. 2A, which shows a state diagram 200 in which an external stimulus (such as a user depressing a button on the tag) produces a change of state from STATE 1 to STATE 2, or vice versa, as represented by the double-headed arrow.

Figure 2B:
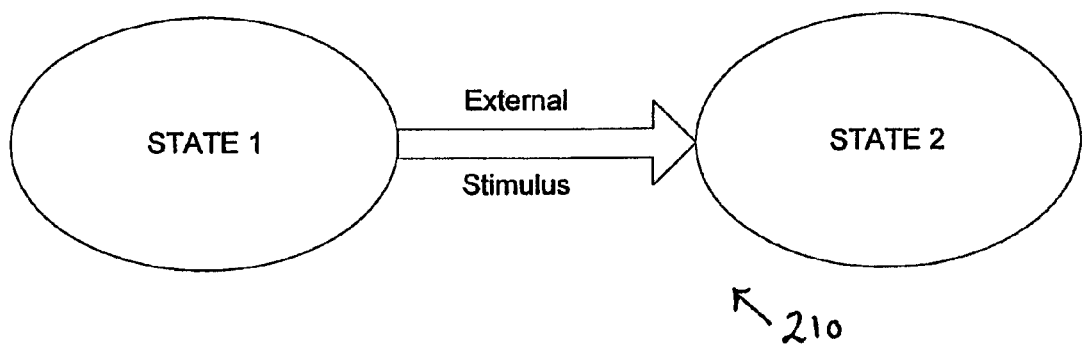

Alternatively, the change of state produced by the external stimulus may be irreversible, such as in the case of many implementations of "sensor tags," wherein a change of state results when a given environmental condition is experienced by the tag (e.g., a temperature threshold is surpassed). This situation is illustrated in FIG. 2B, which shows a state diagram 210 in which an external stimulus (such as a user depressing a button on the tag) produces a change of state from STATE 1 to STATE 2, or vice versa, as represented by the single-headed arrow.

Figure 2C:
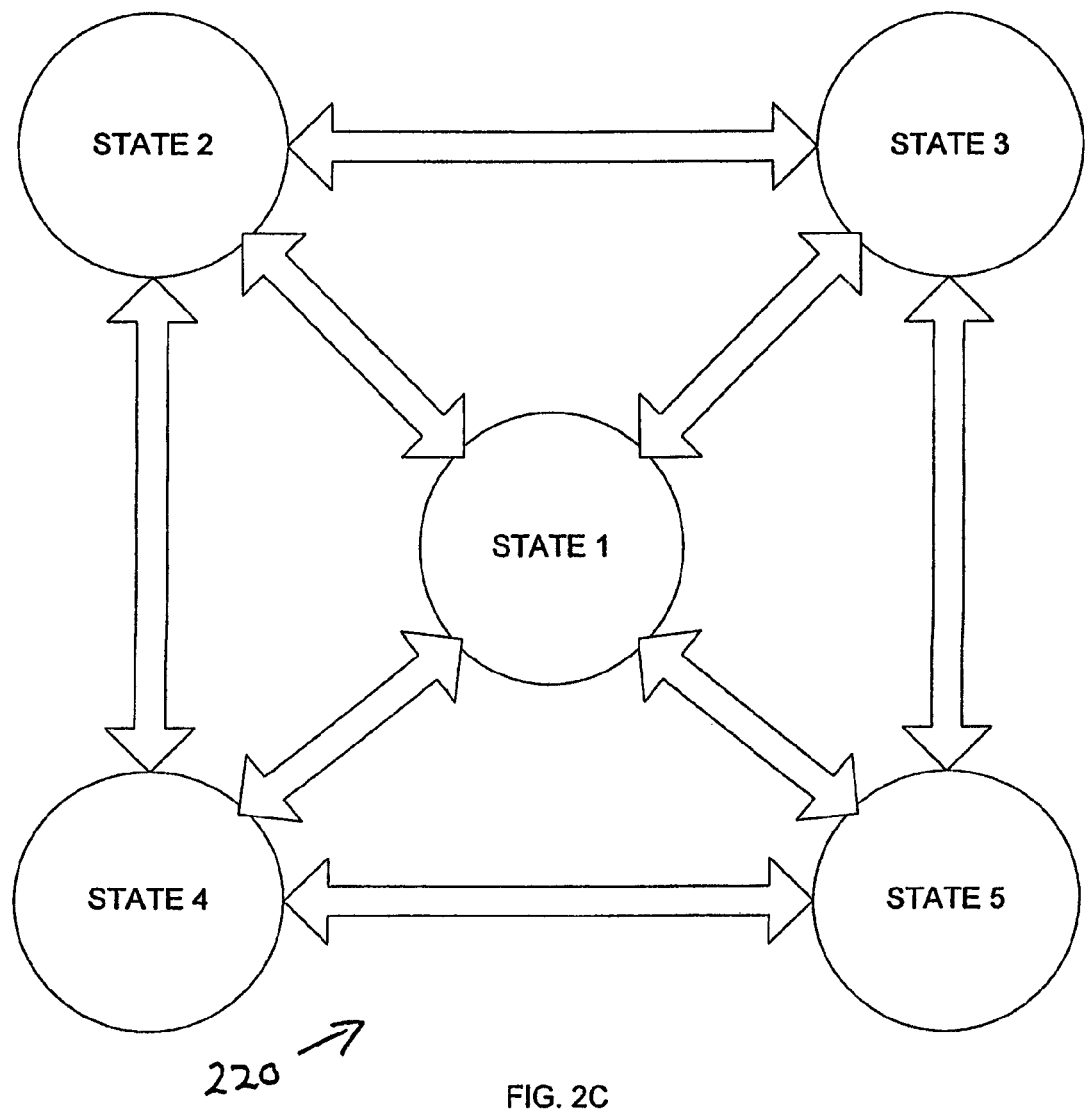

An interactive RF tag in accordance with the present invention may also be configured to have a plurality of states in which it may operate depending on a particular external stimulus received. This situation is represented by the "web" structure illustrated in FIG. 2C, which shows a state diagram 220 in which an external stimulus (such as a user depressing a button on the tag) produces a change of state from STATE 1 to STATE 2, or vice versa. Additionally, the change of state may be from STATE 1 to any of a number of other states (e.g., STATE 3, STATE 4, or STATE 5 in the illustrated embodiment), or from one of those states to another state, as represented by the double-headed arrows, when another external stimulus (such as a user depressing a different button on the tag) is applied to the tag. This latter implementation may find particular use in applications where the interactive tag is used as a controller, and each states results in a different control command being returned to a tag reader in a device under control of the tag.

Various implementations of the invention will now be described with reference to simplified block diagrams. RF tag structures and configurations are well known to those of skill in the art, and implementation details of RF tags, beyond the functional elements described herein, are not the focus of the present invention. One of ordinary skill in the RF tag technology art would be able to make and implement tags in accordance with the present invention without specific guidance with regard to the combination and configuration of all tag structural elements, and the present invention is not limited by any particular implementation. Applications of interactive RF frequency tags in accordance with the present invention are also discussed below.

Interactive radio frequency tags in accordance with the present invention preferably include a passive radio frequency transponder, having an antenna, an interface for receiving an external stimulus, and one or more integrated circuits responsive to the external stimulus received at the interface to change the state of the transponder. The nature of the interface and the corresponding external stimuli, as well as the change of state may vary substantially while remaining consistent with this inventive concept, as discussed in more detail below.

Button Tags

Tags in accordance with the present invention may be configured to change state when a user contacts and/or manipulates an interface on the tag, for example, one or more buttons on the tag is pushed or turned by a user ("button tags"). Variations on this idea include a "single button tag" that may only be read when a button on the tag is pushed; a "switch" tag that switches between memories (or memory addresses) that are accessed for response information when the tag is polled by a reader depending on whether or not a button, or which button, is pushed; an "analog switch" tag that provides a variable response accessed from a memory based on the amount of pressure the user applies to a pressure-sensitive pad, or the movement a user applies(e.g., sliding or turning) to a motion-sensitive button on the tag. FIGS. 3 through 7 illustrate various embodiments of user contact tags in accordance with the present invention.

Figure 3:
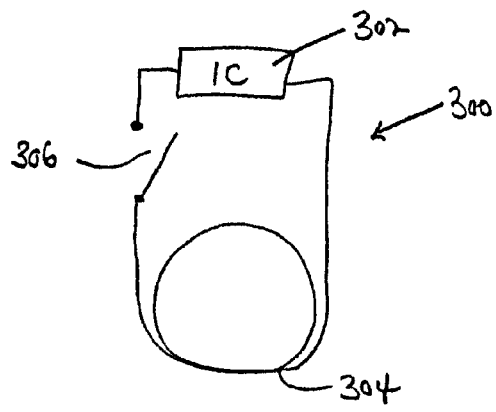
FIG. 3-10 depict simplified block diagrams illustrating various implementations of interactive RF tags in accordance with preferred embodiments of the present invention.

FIG. 3 illustrates a first embodiment of a (passive) interactive radio frequency transponder in accordance with the present invention. As with a conventional RF tag, the transponder 300 has a semiconductor chip (integrated circuit (IC)) 302 with RF circuits, logic and memory, and an antenna 304. In addition, this embodiment of the present invention includes a switch 306 which interrupts the signal flow from the antenna 304 to the IC 302. Thus, this transponder 300 may only be read by a radio frequency transceiver when the switch 306 is closed. Closing the switch changes the state of the transponder from unreadable to readable. In a preferred embodiment, this switch 306 is a mechanical switch which is closed by an external stimulus when a user applies pressure to a button on the transponder.

Figure 4B:
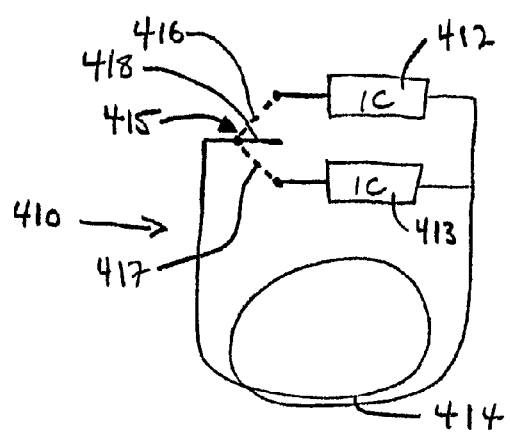
Figure 4A:
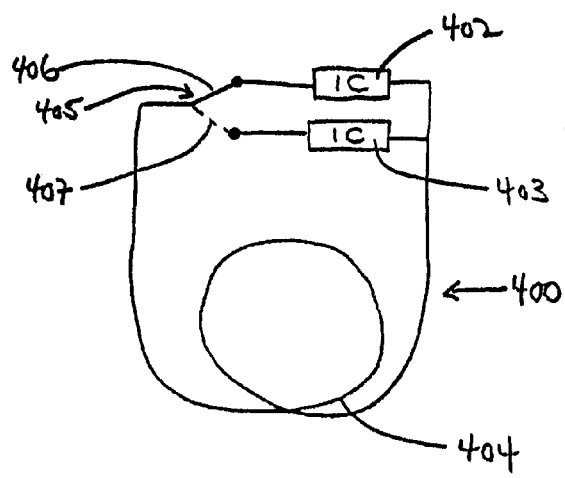

FIG. 4A illustrates a second embodiment of an interactive radio frequency transponder in accordance with the present invention. Like the transponder illustrated in FIG. 3, the transponder 400 is also a "button tag." This embodiment, however, has two ICs 402 and 403 together with an antenna 404. The transponder 400 also has a switch 405 which may be in one of two positions 406 or 407, to connect the ICs 402 or 403, respectively. The switch 405 interrupts the signal flow from the antenna 404 to the ICs 402 and 403. Thus, the response provided to a polling transceiver by this transponder 400 is determined by which position the switch is in. If the switch 405 is position 406, IC 402 is activated and determines the response provided to the polling transceiver. Similarly, if the switch is in position 407, IC 403 is activated and determines the response provided to the polling transceiver.

FIG. 4B illustrates an alternative embodiment of the embodiment shown in FIG. 4A. Like the transponder illustrated in FIG. 4A, the transponder 410 has a switch 415. However, in this embodiment, the switch 415 may be in one of three positions 416 or 417 to connect the ICs 412 or 413, respectively, or 418 which is an open circuit position. The switch 415 interrupts the signal flow from the antenna 414 to the ICs 412 and 413. Thus, the response provided to a polling transceiver by this transponder 410 is determined by which position the switch is in. If the switch 415 is position 416, IC 412 is activated and determines the response provided to the polling transceiver. Similarly, if the switch is in position 417, IC 413 is activated and determines the response provided to the polling transceiver. If the switch is in position 418, there are no closed circuits meaning that no power or data reaches either IC in the transponder, so the tag 410 cannot be read.

A person of skill in the art will recognize that there are many possible alternative implementations of the embodiments of the present invention illustrated in FIGS. 4A and 4B. For example, rather than the transponder having two separate ICs, it may instead have a single IC in which different memory addresses are accessed depending on which position a switch controlled by a user is in.

Figure 5:
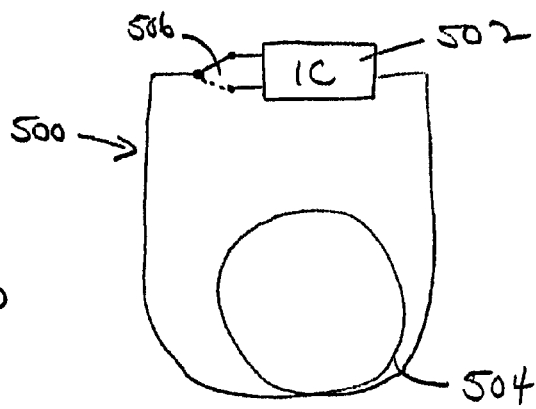

FIG. 5 illustrates another embodiment of an interactive radio frequency transponder in accordance with the present invention which illustrates an example of this concept. The transponder 500 has an IC 502, an antenna 504, and a single switch 506 that closes different circuits depending on its position. In the transponder illustrated in FIG. 5, the switch has two positions, each of which results in the closing of a different circuit that provides power to the IC 502 and accesses a different memory address to determine the response provided to a polling radio frequency transceiver.

It should be noted that while the embodiments illustrated and described with reference to FIGS. 4 and 5 have two alternative closed circuits, passive radio frequency transponders in accordance with the present invention may also be implemented along the same lines, but providing more than two alternatives. For example, as described above with reference to FIG. 2C, passive radio frequency tags in accordance with the present invention may have a plurality of possible states, each accessed, for example, by pressing a different button. Such an implementation of the present invention may be useful, for example, as a controller for electronic devices which incorporate a radio frequency transceiver.

In the embodiment described above with reference to FIG. 3, the transponder is not seen and read by a polling transceiver unless a button on the transceiver is pushed to close the switch. In FIGS. 4A and 5, embodiments are illustrated in which one or another circuit is always closed so that a polling transceiver whose field reached the transponder will always receive one or another response, depending on which button is pushed or which position a switch is in. In the embodiment illustrated in FIG. 4B the switch interrupting the signal path from the antenna to the IC has a third position, providing the possibility that the transponder may or may not be powered and read when it comes within the field of a polling transceiver, depending on the switch position.

Figure 6:
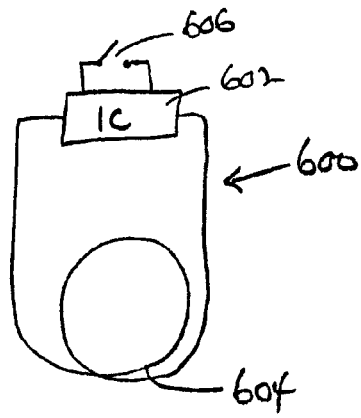

FIG. 6 provides yet another implementation of an interactive transponder in accordance with the present invention. The transponder 600 includes an IC 602 and an antenna 604. There is no switch interrupting the signal path from the antenna to the IC, so the transponder is read whenever it is within the field of a polling transceiver, and a response corresponding to the state of the transponder is provided to the transceiver. The transponder 600 also has a switch 606 connected to the IC 602 which is capable of changing the state of the transponder when closed, for example, by the pushing of a button on the transponder.

Figure 7:
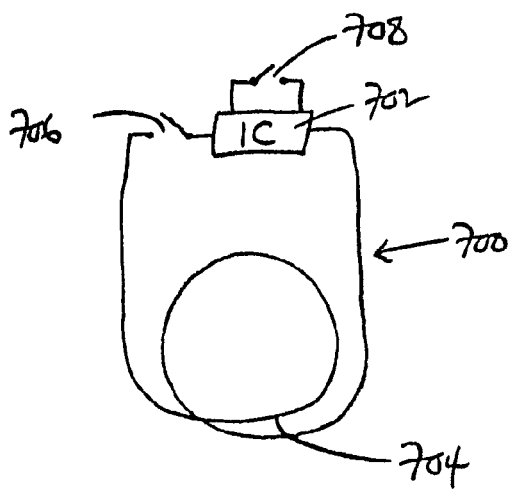

FIG. 7 illustrates another embodiment of an interactive transponder in accordance with the present invention. The transponder 700 combines elements from previously discussed implementations. It includes an IC 702, an antenna 704, and a switch 706 interrupting the signal path from the antenna to the IC. Thus, the transponder may only be read when the switch 706 is closed, for example, by a button being pushed. In addition, the transponder 700 also has a switch 708 connected to the IC 702 which is capable of changing the state of the transponder when closed, for example, by the pushing of a button on the transponder.

As noted above, it should also be understood that the present invention includes embodiments in which a user interactive interface may provide a variable response (e.g., an "analog switch" as opposed to the discrete response provided by the "digital switches" previously described). Transponders in accordance with this aspect of the present invention preferably include a transducer and a variable voltage sensor. The transducer converts a user interaction, such as movement on a motion-sensitive pad on the tag, or the pushing of a pressure sensitive pad, into a voltage detected by the variable voltage sensor. The sensor may be configured to detect when a voltage threshold has been reached and cause a change of state in the transponder resulting in a different response being provided to a polling transceiver. Alternatively, real-time response based on the level of user interaction may be provided.

The various configurations addressed herein are implementation details of the present invention, which, given the concept and guided by the principles of the invention, may be determined without difficulty by a person having skill in the art. Exemplary applications for the embodiments of the present invention described above are discussed below.

Sensor Tags

Another type of interactive RF tag is a "sensor tag." Like the button tags described above, sensor tags change state in response to a particular external stimulus. However, rather than the external stimulus being user intervention with a button on the tag, in this case the external stimulus is provided by a particular environmental condition. For example, if a tag is exposed to light or heat that reaches a given threshold, an alternate memory location containing information reflecting this fact is accessed when the tag is polled by a reader. Alternatively, real-time ("analog") response based on the level or change of the environmental condition sensed may be provided. In this way, such a sensor tag or tags may be used to monitor important environmental conditions affecting articles to which the tags are attached.

Figure 8:
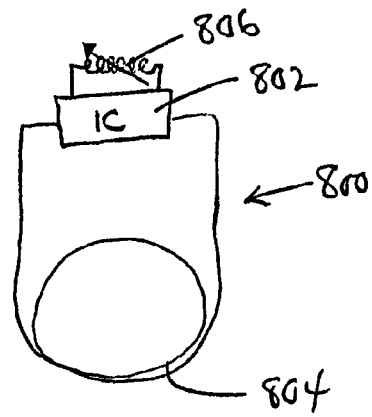

FIG. 8 illustrates a sensor tag implementation of an interactive transponder in accordance with the present invention. The transponder 800 includes an IC 802 and an antenna 804. There is no switch interrupting the signal path from the antenna to the IC, so the transponder is read whenever it is within the field of a polling transceiver, and a response corresponding to the state of the transponder is provided to the transceiver. The transponder 800 also has a sensor 806 connected to the IC 802 which is capable of changing the state of the transponder when a certain external stimulus is applied. The sensor preferably includes a transducer and a variable voltage sensor. The transducer converts an environmental condition into a voltage and the variable voltage sensor detects when a voltage threshold has been reached and causes a change of state in the transponder resulting in a different response being provided to a polling transceiver.

The transducer may be, for example, a photovoltaic cell for detecting light, or a thermal cell for detecting temperature. The change of state occurring in sensor tags such as these may be irreversible, rendering it particularly useful for a variety of applications, as described below. In preferred embodiments, it is not necessary for the tag to be under power in order for the sensor to work since the sensor may respond to an irreversible change in a material property of one of its components in response to a particular environmental condition. Embodiments are also possible wherein a sensor tag in accordance with the present invention may be used to provide real-time response based on the level or change of an environmental condition sensed, such as temperature or pressure, when the tag is under power (i.e., within the RF field of a corresponding transceiver), for example by accessing different memory locations based on the level of the environmental condition sensed.

Figure 9:
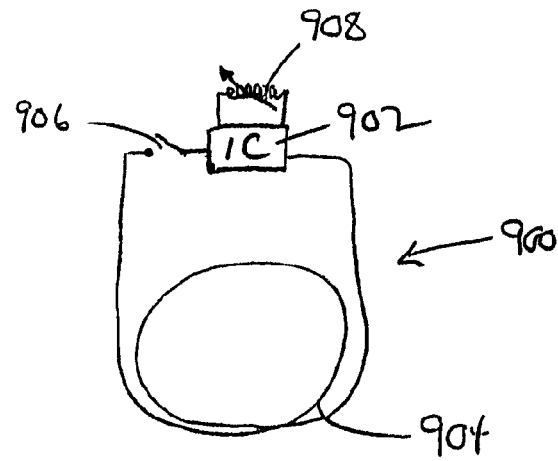

FIG. 9 illustrates another embodiment of an interactive transponder in accordance with the present invention. The transponder 900 combines elements from both previously discussed button tag and sensor tag implementations. It includes an IC 902, an antenna 904, and a switch 906 interrupting the signal path from the antenna to the IC. Thus, the transponder may only be read when the switch 906 is closed, for example, by a button being pushed. The transponder 900 also has a sensor 908, such as that described with reference to FIG. 8, connected to the IC 902 which is capable of changing the state of the transponder when a certain external stimulus is applied.

Output Tags

In addition, the present invention provides interactive RF tags which visually, audibly, tactilely or otherwise signal a state or change of state of an RF tag in response to a particular external stimulus. The external stimulus may be user intervention with a button on the tag or sensation of an environmental condition received at a separate interface as described above, or may be provided by the RF signal itself received at the tag's antenna as discussed below.

Figure 10:
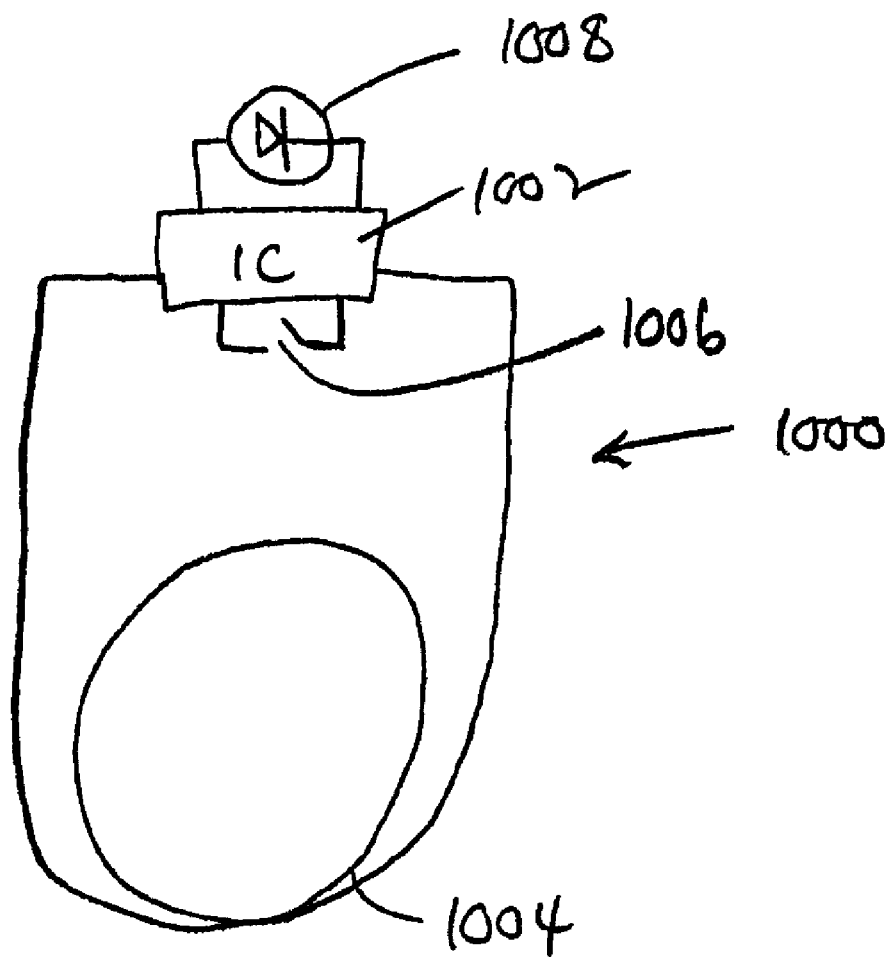

For example, "button" or "sensor" features may be combined with an output feature which visually, audibly, tactilely or otherwise signals the state or change of state of an output RF tag. FIG. 10 illustrates a preferred embodiment of the present invention which provides an example of such a hybrid output tag. A transponder 1000 has an IC 1002, an antenna 1004, and a switch 1006 on the IC. Thus, the transponder may be read whenever the tag is in the field of an associated transceiver, whether or not the button is pushed. In addition, the transponder 1000 also has an output device 1008 connected to the IC 1002 which is capable of generating a signal when the state of the transponder is changed, for example, by the pushing of a button on the transponder to close the switch 1006.

In a preferred embodiment, the output device may be an LED which lights to indicate a state change. Alternative output devices include speakers which are capable of generating audible signals, such as clicks or beeps, or devices which are capable of generating tactile signals, such as a vibration. Of course, alternative configurations may be used in such output tags in accordance with the present invention. For example, output devices, such as light-emitting diodes (LEDs), may be incorporated into any of the previously described embodiments. Those of skill in the art are familiar with such output devices and, given the principles of the present invention described herein, would be able to fabricate interactive radio frequency transponders in accordance with the present invention.

Another embodiment of a hybrid output tag in accordance with the present invention includes the use of a sensor in place of the switch 1006 of the transponder 1000 illustrated in FIG. 10. According to this embodiment, the state of the transponder would change when a given environmental condition was experienced resulting in the activation of the output device 1008 when the transponder is polled by a transceiver.

An additional novel implementation of an output tag involves the incorporation of an output device, such as an LED, into the circuit of the antenna and IC in a passive transponder, so that a signal is generated when the transponder is powered-up upon exposure to the RF field of a polling transceiver. In this instance, the RF field produced by the polling transceiver provides the external stimulus that causes the change of state in the transponder to produce a signal from the output device. In addition, the RF signal may convey information to change the state of the transponder so that the output device is made to signal or not signal when the transponder is under power.

Applications

Interactive RF tags in accordance with the present invention have a myriad of potential control and monitoring applications. The small size and versatility of passive RF tags with respect to materials that may be used to house tags provide distinct advantages over alternative technologies, such as optical (e.g. bar code), magnetic and electronic interfaces which require electrically conductive contacts. RF tags are also not subject to the same limitations and reliability issues as these technologies, such as optical interference, demagnetization, or fouled electrical contacts.

Interactive RF button tags may be used in such items as a "smart business card." With the smart business card, the user presses the appropriate button on a RF tag business card, causing the relevant IC to make contact with the antenna to activate the tag. The card may be equipped with several buttons, each representing a different item of information. So, for instance, when a user presses the "home phone" button on the business card, a transceiver polling the card will receive a response indicating the cardholder's home telephone number. The transceiver may be integrated with a telecommunications device, such as a telephone, which dials the telephone number. Similarly, the user may press "office phone" button on the card to have the same happen with the appropriate office number. Pressing a "Fax" button may similarly initiate a fax to the correct number. Pressing an "E-mail" button may signal a transceiver integrated with a networked computer (or other network device) to access e-mail software and put the addressee's name in the "to" field. In these cases, the data required to conduct these actions may be stored in the actual memory of the tag itself. In alternative embodiments, some or all of the data may be stored off the tag and accessed by a response generated by the tag when polled by a transceiver.

Another application of interactive button tags is in a RF tag media controller. With the media controller, traditional music or video functions (e.g., play, stop, pause, fast forward, rewind) are represented by interactive buttons on, for example, a playing card-size tag. When a user presses a button, the state of the tag changes to provide a response corresponding to the selected function to a polling transceiver integrated with the media player.

Interactive button tags may also be used in other control applications, for example, a "web card." In a preferred embodiment, the web card may have a similar construction to the media controller discussed above, with one or more buttons each representing a different web page or site, or for otherwise controlling a web browser. A user may, for example, select a desired web site by pushing a button on the card. This selection is read by a transceiver integrated with a computer with access to the World Wide Web with the result that the URL for the site is entered in a web browser on the computer and the site is accessed.

A further application for interactive RF tags may be in recording and playing back audio material associated with an item in which a tag is embedded or connected. For example, a "memory binder" may include photographs, postcards and souvenirs from a user's vacation. Each of the items in the binder may have associated with it one or more buttons for playing and/or recording information relating to the item. The memory binder has associated with it a transceiver integrated with an electronic device or system having memory, circuitry and a speaker for storing and playing audio messages relating to particular items in the binder. The device or system may also have a microphone and associated circuitry to enable the user to record a message relating to a particular item when an interactive RF tag button associated with the item is pressed. Alternatively, the audio messages may be prerecorded in a memory on a tag or accessible to a tag embedded in the item (e.g., a "talking postcard").

Examples of electronic devices or systems having integrated transceivers for use in conjunction with a memory binder application of an interactive RF tag in accordance with the present invention are a computer system with audio capability or in a telephone with an associated memory access service provided by the telephone system operator. An electronic device designed specifically for the purpose of providing the features needed by a memory binder as described above may also be constructed and used.

It will be noted that the interactive RF tag applications described herein are implemented using RF transceivers which are integrated with other electronic devices, such as media players, telephones, and computers in order that the change of state in a tag which relates to a particular function of a device may be conveyed to the device. RF transceivers have conventionally been integrated with a variety of electronic devices in conventional applications of RF technology for tracking functions. Given the concept and principles of the present invention as described herein, one of ordinary skill in the art would be able to integrate RF transceivers into the new device types noted herein in order to implement applications of the present invention without difficulty.

Applications for sensor tags in accordance with the present invention include product monitoring tags. For example, products which are sensitive to environmental conditions, such as food and a variety of other commodities and consumer products, may have sensor tags such as described herein attached to them or to their packaging, shipping or storage containers. The tags can be configured to monitor a particular environmental condition (or more than one) and the tag can be read before the product is used to ensure that its safety or efficacy has not been compromised by exposure to a deleterious environmental condition.

Such tags are well-suited to being configured so that a change of state that occurs upon a particular deleterious environmental threshold being reached is maintained. For some applications, these tags are also well-suited to being combined with an output device to produce an output tag that will signal a change of state that occurs upon a particular deleterious environmental threshold being reached without the need for the tag memory to be read—when the tag is powered up upon polling by a transceiver, the output device, such as an LED, signals the change of state to an observing user.

Output tags such as described herein may be useful to signal a change of state in an interactive RF tag in accordance with preferred embodiments of the present invention. Hybrid output tags may be used in any of the applications noted above to signal a change of state for functional or aesthetic purposes. In addition, as noted above, an output device may be included in a RF tag circuit so that a signal is generated whenever the tag is read, or in accordance with an external stimulus provided via the associated transceiver's RF signal and received at its antenna.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

We claim:

1. An interactive card for accessing web sites, the interactive card comprising:
   a card surface carrying human-readable indicia,
      wherein the human-readable indicia include indications of multiple web sites;
   a radio frequency transponder including—
      an integrated circuit with memory storing multiple data items,
         wherein at least some of the multiple data items are associated with the multiple human-readable indicia, and
         wherein the data items include URL references to the multiple web sites; and
      an antenna that receives an incident signal, wherein the antenna is coupled to the integrated circuit; and
   multiple human-selectable switches electrically coupled to the integrated circuit and carried by the card,
      wherein each human-selectable switch, when selected by a human, is configured to cause the integrated circuit to provide to the antenna an output signal for an associated stored data item when the antenna receives the incident signal,
      wherein the output signal permits access one of the multiple websites via one of the URL references.

2. The interactive card of claim 1 further comprising an output device for emitting light from the interactive card.

3. The interactive card of claim 1 further comprising an output device for emitting sound from the interactive card.

4. The interactive card of claim 1 wherein the human-selectable switches include controls for controlling a browser.

5. An interactive card for providing output to a user, the interactive card comprising:
   a card base carrying a picture or human-readable indicia;
   an audio input device carried by the base;
   an audio output device carried by the base;
   a radio frequency transponder carried by the base and coupled to the audio input device and to the audio output device, wherein the radio frequency transponder includes—
      an integrated circuit with memory storing multiple data items, wherein each of the multiple data items corresponds to an item of stored audio information; and
      an antenna that receives an incident signal; and
   multiple human-selectable switches coupled to the integrated circuit,
      wherein at least one of the multiple human-selectable switches, when selected by a human, is configured to cause the integrated circuit to receive input audio data via the audio input device and store it in the memory, when the antenna receives the incident signal, and,
      wherein at least another of the multiple human-selectable switches, when selected by a human, is configured to cause the integrated circuit to play the input audio data stored in the memory via the audio output device, when the antenna receives the incident signal.

6. The interactive card of claim 5, wherein the card base carries at least one photograph, postcard or vacation souvenir.

7. The interactive card of claim 5, wherein the multiple data items further include a reference to a website.

8. The interactive card of claim 5, wherein the audio input device is a microphone and the audio output device is a speaker.

9. The interactive card of claim 5, wherein the memory includes prerecorded audio messages.

10. An interactive card for accessing web sites, the interactive card comprising:
    a card means for carrying human-readable indicia,
       wherein the human-readable indicia include indications of multiple web sites;
    a radio frequency transponder means for receiving a wireless signal, wherein the radio frequency transponder means includes—
       an integrated circuit means for storing multiple data items,
          wherein at least some of the multiple data items are associated with the multiple human-readable indicia, and
          wherein the data items include URL references to the multiple web sites; and
       antenna means for receiving an incident signal, wherein the antenna means is coupled to the integrated circuit; and
    multiple human-selectable means for electronically switching, wherein the means for electronically switching is coupled to the integrated circuit means and is carried by the card means,
       wherein each human-selectable means, when selected by a human, is configured to cause the integrated circuit means to provide to the antenna means an output signal for an associated stored data item when the antenna means receives the incident signal,
       wherein the output signal permits access one of the multiple websites via one of the URL references.

11. The interactive card of claim 10 further comprising an output device for emitting light from the interactive card.

12. The interactive card of claim 10 further comprising an output device for emitting sound from the interactive card.

13. The interactive card of claim 10 wherein the human-selectable means include controls for controlling a browser.

14. An interactive card for providing output to a user, the interactive card comprising:
    a card base carrying a picture or human-readable indicia;
    an audio input means for receiving audio and carried by the base;
    an audio output means for outputting audio and carried by the base;
    a radio frequency transponder means for processing a wireless signal, carried by the base, and coupled to the audio input device and to the audio output device, wherein the radio frequency transponder means includes—
       circuit means for storing multiple data items, wherein each of the multiple data items corresponds to an item of stored audio information; and
       an antenna means that receives an incident signal; and
    multiple human-selectable switches coupled to the circuit means,
       wherein at least one of the multiple human-selectable switches, when selected by a human, is configured to cause the circuit means to receive input audio data via the audio input means and store it in the circuit means, when the antenna means receives the incident signal, and,
       wherein at least another of the multiple human-selectable switches, when selected by a human, is configured to cause the circuit means to play the input audio data stored in the circuit means via the audio output means, when the antenna means receives the incident signal.

15. The interactive card of claim 14, wherein the card base carries at least one photograph, postcard or vacation souvenir.

16. The interactive card of claim 14, wherein the multiple data items further include a reference to a website.

17. The interactive card of claim 14, wherein the audio input means includes a microphone and the audio output means includes a speaker.

18. The interactive card of claim 14, wherein the circuit means includes prerecorded audio messages.

* * * * *

UNITED STATES PATENT AND TRADEMARK OFFICE
CERTIFICATE OF CORRECTION

PATENT NO.        : 8,054,163 B2  
APPLICATION NO.   : 12/909800  
DATED             : November 8, 2011  
INVENTOR(S)       : Oliver T. Bayley et al.

Page 1 of 1

It is certified that error appears in the above-identified patent and that said Letters Patent is hereby corrected as shown below:

In column 1, line 7, delete "2009" and insert -- 2009, --, therefor.

In column 1, line 11, delete "1999" and insert -- 1999; --, therefor.

In column 2, line 8, delete "RE tags" and insert -- RF tags --, therefor.

In column 2, line 38, delete "my be" and insert -- may be --, therefor.

Signed and Sealed this
Thirty-first Day of January, 2012

David J. Kappos
*Director of the United States Patent and Trademark Office*